US008750302B2

United States Patent
Uchiike

(10) Patent No.: US 8,750,302 B2
(45) Date of Patent: Jun. 10, 2014

(54) PICTURE CONTROL DEVICE AND METHOD OF THE SAME

(75) Inventor: Hiroshi Uchiike, Fujisawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/450,231

(22) Filed: Apr. 18, 2012

(65) Prior Publication Data

US 2012/0201516 A1 Aug. 9, 2012

Related U.S. Application Data

(63) Continuation of application No. 11/854,196, filed on Sep. 12, 2007, now Pat. No. 8,179,959.

(30) Foreign Application Priority Data

Sep. 15, 2006 (JP) .................................. 2006-250903

(51) Int. Cl.
*H04L 12/28* (2006.01)
(52) U.S. Cl.
USPC ...... 370/391; 375/240.01; 386/200; 386/239; 386/248; 725/109

(58) Field of Classification Search
USPC .................. 375/240, 240.01; 348/14.12, 473
See application file for complete search history.

(56) References Cited

U.S. PATENT DOCUMENTS

| 5,327,240 A * | 7/1994 | Golston et al. ................. 348/607 |
| 2005/0074063 A1* | 4/2005 | Nair et al. ................. 375/240.11 |
| 2005/0204109 A1* | 9/2005 | Apostolopoulos et al. ... 711/163 |

OTHER PUBLICATIONS

Doom9's Forum, 2005, pp. 1-6.*

* cited by examiner

*Primary Examiner* — Nicholas Sloms
(74) *Attorney, Agent, or Firm* — Canon USA, Inc. IP Division

(57) ABSTRACT

A picture control device configured to convert and output a bit-rate of an input picture data stream having an input bit-rate, includes: a first decoder configured to decode the input picture data stream; an encoder configured to encode the output of the first decoder with a plurality of converted bit-rates; an output unit configured to output the picture data encoded with a first bit-rate by the encoder, for recording; a second decoder configured to decode the same picture data encoded at a second bit-rate by the encoder; and a control unit configured to determine the second bit-rate based on the first bit-rate.

16 Claims, 5 Drawing Sheets

FIG. 3

| No. | MEDIA TYPE | ID No. | OUTPUT BIT-RATE | MAXIMUM PLAYABLE BIT-RATE |
|---|---|---|---|---|
| 0 | | | | 24Mbps |
| 1 | SD-Card | 00001 | 300kbps | 15Mbps |
| 2 | | | | |
| 3 | | | | |

FIG. 4

| No. | MEDIA TYPE | ID No. | OUTPUT BIT-RATE | MAXIMUM PLAYABLE BIT-RATE |
|---|---|---|---|---|
| 0 | | | | 24Mbps |
| 1 | SD-Card | 00001 | 300kbps | 15Mbps |
| 2 | DVD | 00002 | 4.6Mbps | 5Mbps |
| 3 | | | | |

FIG. 5

| No. | MEDIA TYPE | ID No. | OUTPUT BIT-RATE | MAXIMUM PLAYABLE BIT-RATE |
|---|---|---|---|---|
| 0 | | | | 24Mbps |
| 1 | SD-Card | 00001 | 300kbps | 15Mbps |
| 2 | DVD | 00002 | 4.6Mbps | 5Mbps |
| 3 | SD-Card | 00003 | 1.5Mbps | 3Mbps |
| 4 | SD-Card | 00004 | 200kbps | 2Mbps |

FIG. 6

| No. | MEDIA TYPE | ID No. | OUTPUT BIT-RATE | MAXIMUM PLAYABLE BIT-RATE |
|---|---|---|---|---|
| 0 | | | | 24Mbps |
| 1 | SD-Card | 00001 | 300kbps | 15Mbps |
| 2 | | | | |
| 3 | SD-Card | 00003 | 1.5Mbps | 3Mbps |
| 4 | SD-Card | 00004 | 200kbps | 2Mbps |

FIG. 7

| No. | MEDIA TYPE | ID No. | OUTPUT BIT-RATE | MAXIMUM PLAYABLE BIT-RATE |
|---|---|---|---|---|
| 0 | | | | 24Mbps |
| 1 | SD-Card | 00001 | 300kbps | 15Mbps |
| 2 | SD-Card | 00003 | 1.5Mbps | 10Mbps |
| 3 | | | | |
| 4 | SD-Card | 00004 | 200kbps | 2Mbps |

FIG. 8

| No. | MEDIA TYPE | ID No. | OUTPUT BIT-RATE | MAXIMUM PLAYABLE BIT-RATE |
|---|---|---|---|---|
| 0 | | | | 24Mbps |
| 1 | SD-Card | 00001 | 300kbps | 15Mbps |
| 2 | SD-Card | 00003 | 1.5Mbps | 10Mbps |
| 3 | SD-Card | 00004 | 200kbps | 9Mbps |
| 4 | | | | |

PICTURE CONTROL DEVICE AND METHOD OF THE SAME

CROSS-REFERENCE TO RELATED APPLICATIONS

This application is a Continuation of U.S. application Ser. No. 11/854,196, filed Sep. 12, 2007, which claims the benefit of Japanese Application No. 2006-250903 filed Sep. 15, 2006, which are hereby incorporated by reference herein in their entireties.

BACKGROUND OF THE INVENTION

1. Field of the Invention

The present invention relates to a picture control device which moves and plays accumulated video content, and more specifically relates to a picture control device which moves and plays video content subjected to copy restriction by controlling the bit rate thereof.

2. Description of the Related Art

Current digital broadcasting uses an accumulation method called copy-once. Copy-once is also called "single copy permissible" or "one generation copy permissible". With this method, at the point in time of the broadcast content being accumulated (recorded), the "single" or "one generation" is completed, and the recorded content becomes "copy inhibited" content. Accordingly, in the case of outputting broadcast content to an external recording medium, an operation called "move" is performed. That is to say, in exchange for output to the external recording medium, the original content recorded is deleted. An external recording medium is a recording area or recording medium other than the recording device wherein the broadcast content is recorded, and is not necessarily a broadcast receiving device or an arrangement set externally from the recording device.

However, with this method, if any trouble occurs during moving, there has been the possibility of the output destination content and the original content both disappearing or becoming incomplete. Also, outputting the original content to an external recording medium once but being able to store the content again in the original device has not always been possible.

There is another copy control called check-in/check-out which is disclosed in Japanese Patent Laid-Open No. 2003-132625. Check-out means that the original content which is permitted to be copied N (N is a positive number) times is copied from the recording medium wherein the original contents are recorded to other recording devices the maximum N times. In this case, the original content is not erased, and the copy control information is decremented to (N−1) times. In the event of N=0, further copies cannot be made. Also, normally, content which has been duplicated once can be played back, but cannot be copied further. Check-in means that when the copy control information of the original content is at (N−1) times, for example, processing is performed to return the content from the other recording medium to which copy has been made. In this event, the copy control information of the original content is changed to ((N−1)+1). The content recorded in the other recording medium is erased at this time.

An information transfer device is disclosed in Japanese Patent Laid-Open No. 2005-158233, where even in the event of a move performed with compression, the original information can be returned with an inverse move.

The original content is locally encrypted, and an encryption key is transmitted therewith at time of check-out. The encrypted original content cannot be played back, but will not be deleted. At the time of check-in, by moving only the encryption key, the encrypted original content is enabled to be played back, and the moved copy content is disabled for playback.

An information management method for separating and managing license information to enable content playback when content is recorded onto the HDD of a video recorder is disclosed in Japanese Patent Laid-Open No. 2006-004543. In this method, by transferring the license information and lowered-bit-rate content data and content ID to a portable terminal, the content data can be virtually moved.

However, with the information transfer device disclosed in Japanese Patent Laid-Open No. 2005-158233, and the information playback device disclosed in Japanese Patent Laid-Open No. 2006-004543, once the content is output externally, the accumulated content cannot be played back without the encryption key being returned. That is to say, if a user outputs the content externally, another user cannot view or listen to the content until the encryption key has been returned, thus causing an inconvenience. Improvements in functionality of portable terminals means further increases in opportunities for copying content accumulated in a digital television receiver, for example to a portable terminal, and viewing this out-of-doors, in the future.

With the copy controls with check-in/check-out as described in Japanese Patent Laid-Open No. 2003-132625, the above-described inconvenience does not occur, but for digital broadcast content, the copy-once restrictions generally apply.

Thus, with the present invention, in the case of outputting content recorded from a digital broadcast or the like which has copy-once restrictions to an external device, the format of the output thereof is managed. That is to say, the present invention stores how (i.e. with what resolution or bit-rate) the output (check-out) is made to which recording region or recording medium. The encrypted original content itself is then not changed, but restrictions are provided as to the playback of the original content according to the output format. Also, by returning (check-in) the output content, the restrictions for playback are lifted. That is to say, with the present invention, even in a case wherein video content is output to an external media, the original content can be viewed/listened to with restrictions as to the playback quality thereof.

SUMMARY OF THE INVENTION

To this end, a picture control device according to an embodiment of the present invention, configured to convert a bit-rate of an input picture data stream having an input bit-rate and output a picture data stream with a converted bit-rate, includes: a first decoder configured to decode the input picture data stream; an encoder configured to encode the output of the first decoder with a plurality of converted bit-rates; an output unit configured to output the picture data encoded with a first bit-rate by the encoder, for recording; a second decoder configured to decode the same picture data encoded at a second bit-rate by the encoder; and a control unit configured to determine the second bit-rate based on the first bit-rate.

According to the picture control device of the present invention, even in the event that the content is output to an external device such as a portable terminal or the like, the original content can be viewed/listened to with restrictions as to the playback quality thereof, and thus viewing/listening at both the output source and the output destination of the content can be performed.

Also, the copy-once restrictions can be upheld in the sense of not duplicating exactly the same content.

Further features of the present invention will become apparent from the following description of exemplary embodiments with reference to the attached drawings.

BRIEF DESCRIPTION OF THE DRAWINGS

FIG. 3 shows an output content management table.
FIG. 4 shows an output content management table.
FIG. 5 shows an output content management table.
FIG. 6 shows an output content management table.
FIG. 7 shows an output content management table.
FIG. 8 shows an output content management table.

DESCRIPTION OF THE EMBODIMENTS

Figure 1:
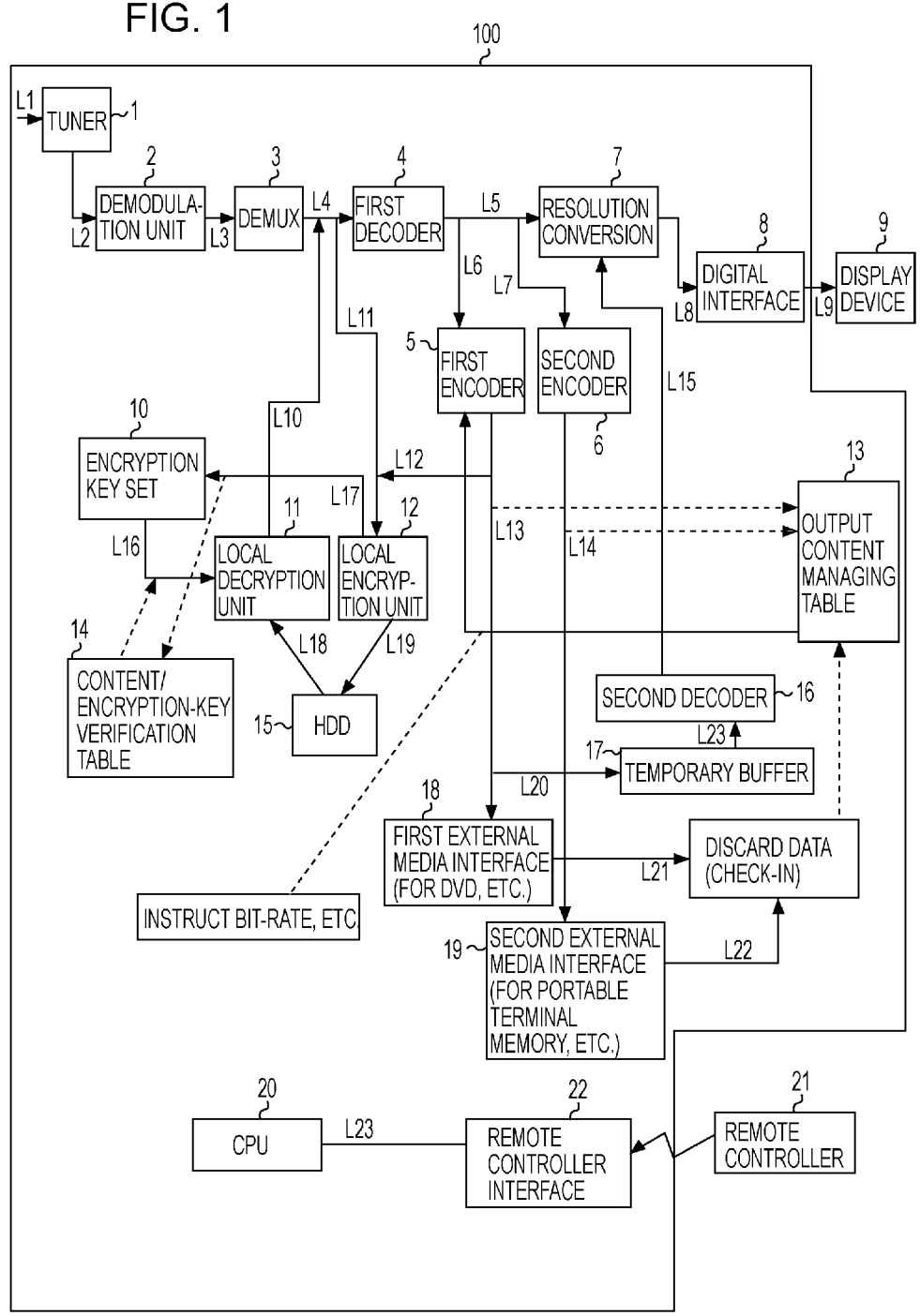
FIG. 1 is a system block diagram of an embodiment of the present invention.

An embodiment of the present invention will be described with reference to the drawings. First, a normal playback operation will be described with the picture control device 100.

A tuner 1 receives terrestrial digital signals from a terrestrial antenna (not shown) or parabolic antenna (not shown), via a signal line L1. The received signal is passed through a bandwidth filter, down-converter, and so forth, then passed through a signal line L2 and is output to a demodulation unit 2. Now, along with performing demodulating processing matching the transfer format, error-correction processing or the like is performed, and a desired MPEG 2 transport stream (TS) is transferred to a de-multiplexer (DEMUX) 3 via a signal line L3. The DEMUX 3 separates picture data and audio data of a desired program from the TS into attached information.

The separated picture data is decoded at a decoder 4 via a signal line L4, and is converted to a raster scan display format. After this, the data is transferred to a downstream resolution conversion unit 7 via a signal line L5, as a program picture source.

At the resolution conversion unit 7, pre-processing is performed, such as at a matrix circuit for converting from a YUV color-difference signal to an RGB signal or an I-P converting circuit for converting a scanning method from interlaced to progressive. A CPU 20 sets resolution conversion parameters (enlargement rate, reduction rate, weighting filter coefficient for enlarging/reducing, and the like) based on display format (number of display lines, number of dots or colors), and screen layout information which is preset beforehand. Enlarging/reducing/same-size processing is performed based on the resolution conversion parameters set therein.

The signal processed in the resolution conversion unit is transmitted to a digital interface 8 via a signal line L8. Here the picture data is converted to a format corresponding to the resolution of a display unit 9, and is output via a signal line L9.

Recording of the broadcast content (video content) including the picture data is performed by way of the two paths described below.

With a first path, the TS obtained by taking out only a desired portion of a program with the DEMUX 3 is decoded with a first decoder 4, and further the picture data encoded again with the first encoder 5 is recorded in a storage device (HDD) 15. With a second path, the TS taken out in the same way at the DEMUX 3 is stored in the storage device (HDD) 15 without going through the first decoder 4. With either path, the picture data is recorded in the storage device 15 (HDD) via a signal line L19 after being subjected to encryption at a local encrypting unit 12. In this event, the key used for encrypting is retained in an encryption-key set 10 via a signal line L17, and also the association information of which content is encrypted with which encryption key is stored in a content/encryption-key verification table 14. The reason for encrypting the picture data in the event of recording is as follows. With the present invention, even when the content is output externally, restrictions are placed only on content playback, and the content data itself is not changed. Therefore, in the case of accumulating without encrypting, a user would be able to freely play back the content data in the original state.

In the case of normal playback, the content/encryption-key verification table 14 is referenced, and the key used at the time of encrypting is taken out of the encryption key set 10. A local decryption unit 11 decrypts the encryption of the picture data read from the HDD 15 with the key thereof and outputs the picture data to the first decoder 4. The picture signal that has been subjected to decrypting of the encryption is then decoded with the first decoder 4, output to the display unit 9 via the resolution conversion unit 7 and digital interface 8, and is displayed as a picture. An arrangement may also be made wherein a local decryption unit 11 and a local encryption unit 12 are functionally integrated as one encryption unit.

Next, operations when outputting (check-out) content to external media and when returning (check-in) the content from the external media will be described.

First, an operation in the case of checking out content which is locally encrypted and recorded will be described. Let us say that the original bit-rate of this content is 24 Mbps and is output at a bit-rate of 300 kbps for a portable terminal. First the user inserts memory for the portable terminal to a second external media interface 19. User instructions from a remote controller 21 are transmitted to a CPU 20 via a remote controller interface 22 and L23. The CPU 20 controls the picture data of the content subjected to instruction for output so as to be output from the HDD 18 to the local decryption unit 11. The CPU 20 specifies an encryption key which will be paired with the content subjected to instruction for output from the content/encryption-key verification table 14. The specified key is taken out of the encryption-key set 10. The picture data regarding which encryption has been decrypted at the local decryption unit 11 using this key is then decoded at the first decoder 4. The decoded picture signal is encoded with a second encoder 6. Upon being converted to the desired bit-rate (here, 300 kbps) and appropriate resolution for the display unit of the portable terminal serving as the output destination, the data is written to the memory inserted by the user. At this time, the information relating to the bit-rate of the output content is managed by an output content managing table 13 shown in FIG. 3. For each output content, information for "at which bit-rate (output bit-rate)" output is made to "which recording medium (media type)" is recorded. Also, in the event of playing back at the information processing device 100, the "maximum playable bit-rate (playable bit-rate)" which is set according to the output bit-rate is also recorded.

Information to be managed by the output content managing table 13 can be content resolution other than bit-rate. In order to identify the output medium, a unique identification number can be assigned for each medium and managed thereby. Note that an arrangement may be made wherein the second external media interface 19 is a general-use input/output port such as a USB port, for example, with desired memory being connected to this port.

Figure 2:
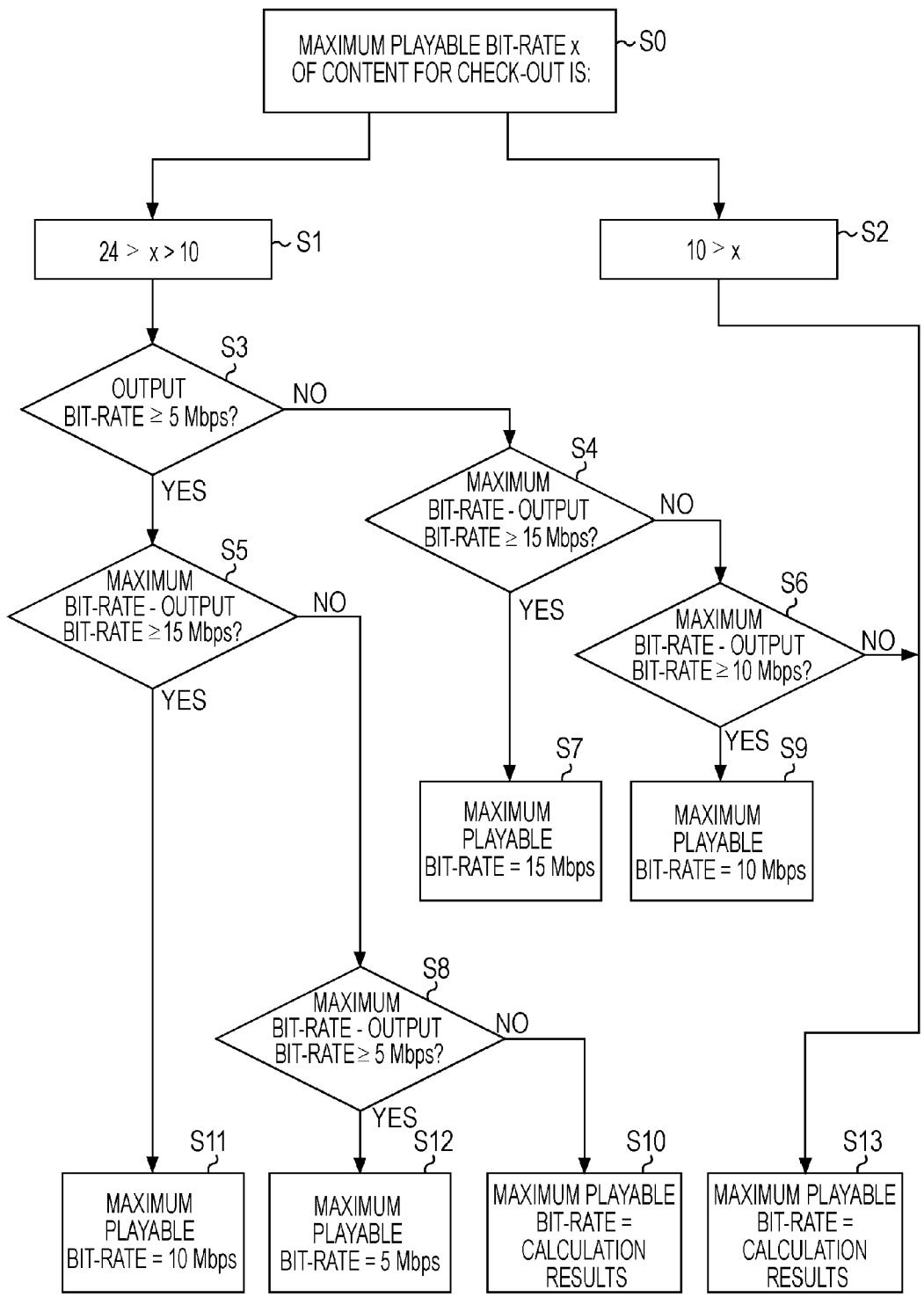
FIG. 2 is a flow chart for describing an algorithm for determining the maximum playable bit-rate at time of check-out.

An algorithm for finding the maximum value of the playable bit-rate is expressed in the flow chart shown in FIG. 2. (With this algorithm, any decimal points are rounded up when the bit-rate is shown in units of Mbps. For example, 300 kbps is 0.3 Mbps, and accordingly is rounded up and treated as 1 Mbps.) The maximum value x (where x is a positive number) of a playable bit-rate of content which has never been output will be the original bit-rate (24 Mbps in this example). Accordingly the flow chart in FIG. 2 starts from S0, and first is advanced to S1 and then S3. Next, the output bit-rate is 300 kbps, but is rounded up to 1 Mbps (this rounding up is only performed when computing the maximum playable bit-rate. The output is not necessarily performed at 1 Mbps in reality when the output bit-rate is instructed as 300 kbps) and the flow is advanced to S4 at the branch in S3. At the branch in S4, the calculation results of the bit-rate of the difference between the maximum playable bit-rate and the output bit-rate (maximum-output) is referenced. In this example, 24−1=23 Mbps, so the flow is advanced to S7, where the maximum playable bit-rate is 15 Mbps. Note that content of 300 kbps is output from content of 24 Mbps, and yet the maximum playable bit-rate is not 23.7 Mbps, but rather is decreased to 15 Mbps. For the 300 kbps amount output externally and bit-rate lowered, the image quality has very little change to the human eye, so therefore (although this is not a copy in the strictest sense) from the user perspective, this is deemed as a copy having been made. Since this would greatly deviate from the principle of the copy-once, an algorithm is purposely configured to add a penalty for operations to output externally.

That is to say, in the case that the output content bit-rate is smaller than a predetermined bit-rate k (Mbps) (where k is a positive number), the maximum playable bit-rate can be set as a predetermined value m (Mbps) (where m is a positive number). Now, k and m are set based on the original content bit-rate x (Mbps). Specifically, from the perspective of a lowered image quality sensed by the user, $0.1<k/x<0.3$ and $0.5<m/x<0.8$ hold.

Content/output information and corresponding playback control information is shown in the table in FIG. 3. Also, the sum of the output bit-rate (first bit-rate) and maximum playable bit-rate (second bit-rate) is set to be smaller than the original content bit-rate (the bit-rate of the input picture data).

Next, following the above-mentioned output operation, a case will be described wherein the same content is output further to a DVD with a bit-rate of 4.6 Mbps. First, the user inserts a writable DVD media in the first external media interface 18. The CPU 20 is instructed by the remote controller 21 to output the content with a 4.6 Mbps bit-rate. The CPU 20 finds out the encryption key, which is paired with the content instructed to be output, from the content/encryption-key verifying table 14, and takes out the desired encryption-key from the encryption-key set 10. The local decryption unit 11 decrypts the encryption of the content data using the key. The picture signal then decoded with the first decoder 4 is further transmitted to the first encoder 5 via signal lines L5 and L6. Here the signal is converted to a desired bit-rate/resolution, and is written to the DVD inserted by the user via the signal line L13 and first external media interface 18.

Computing the maximum playable bit-rate will also be described according to the flow chart in FIG. 2. First, the maximum playable bit-rate before outputting to the DVD is 15 Mbps, so the flow is advanced to S3. Output of 4.6 Mbps is to be output, so the value used for calculations is 5 Mbps, and the flow is advanced from the step in S3 to S5. The maximum output bit-rate is 15−5=10 Mbps so the flow is advanced to S8. From the calculation results of the maximum output, the flow is advanced from S8 to S12, and the maximum playable bit-rate becomes 5 Mbps. Consequently, the content/output information and corresponding playback control information table is updated as shown in FIG. 4.

In the same way, if further output is performed once each with bit-rates of 1.5 Mbps and 200 kbps, the content/output information and corresponding playback control information table would be finally updated as shown in FIG. 5.

An operation in the case where, playback of such content is instructed after the maximum playable bit-rate is determined, will be described. In the case that playback instruction is performed as to the CPU 20 from the remote controller 21, the CPU 20 references the output content managing table 13 to obtain the output history of the content thereof and maximum playable bit-rate, as shown in FIG. 1.

In the case that there is no output history (i.e. the maximum bit-rate and the original bit-rate are the same), naturally the previously mentioned normal playback operation will be performed.

In the case that the maximum playable bit-rate has been changed, the operation after being transmitted to the first decoder 4 differs. Since the maximum bit-rate is different, the results decoded at the first decoder 4 are not output without change to the resolution conversion unit 7. The picture data is output to the first encoder 5 via the signal lines L5 and L6 under the control of the CPU 20. The first encoder 5 references the output content managing table 13 and performs encoding to match the maximum playable bit-rate after being obtained (the maximum playable bit-rate of the 2 Mbps recorded in row No. 4 as shown in FIG. 5 in this case). The picture data which is encoded again is transmitted to a temporary buffer 17 and second decoder 16 via L13, L20, and L23. The picture data decoded again at the second decoder 16 is transferred to the resolution conversion unit 7 via L15, and is output to the display unit further via a digital interface.

Next, the procedure for returning (check-in) the output content from the state wherein output is performed to four external media in the above-described example, will be described. The case wherein the content output to a DVD in the above example being returned to the picture control device 100 will be described. First the user inserts the DVD media used at the time of output to the first external media interface 18, and instructs check-in of the content to the CPU 20 with the remote controller 21. The CPU 20 erases the content from the DVD, and updates the output content managing table 13. The table updating procedure is as follows.

First, the recorded portion which had been output to the DVD is erased from the output content managing table 13 (FIG. 6). The maximum playable bit-rate before outputting to the DVD is 15 Mbps. Based on this, calculations for the maximum playable bit-rate is performed again as to the output of 1.5 Mbps and 200 kbps performed after outputting to the DVD. First calculations are performed using row No. 1 and row No. 3 in FIG. 6. In this case, if calculations are performed according to the flow chart in FIG. 2 with the maximum playable bit-rate=15 Mbps and output bit-rate=2 Mbps, at this point the maximum playable bit-rate will be 10 Mbps. The results thereof are written in row No. 2, and then row No. 3 is erased (FIG. 7). Further, by performing calculations according to the flow chart wherein the maximum playable bit-rate=10 Mbps and output bit-rate=1 Mbps, the maximum playable bit-rate becomes 9 Mbps. The results thereof are written in row No. 3, row No. 4 is erased, and the final results are obtained (FIG. 8). Returning other content can be returned as well by performing calculations in the same way, and once all of the output content is finally returned, playback can be performed at the original bit-rate.

An example has been described above for determining the maximum playable bit-rate for original content, with a focus on the bit-rate in the event of outputting content from the picture control device 100. The restrictions for a playable bit-rate are not necessarily based on the output bit-rate. For example, the maximum bit-rate of original content may be restricted based on the "resolution" of the content to be output. Also, the maximum bit-rate of original content may be restricted based on whether all of the content is output or only a portion thereof. Of course, a combination thereof may also be used. Parameters restricting the original content may be parameters other than the bit-rate, for example, may be resolution or the like, or may be a combination of multiple parameters. With the present invention, in the case of outputting (check-out) a given content externally, the original content is restricted from being played back at the original state thereof. Also, in the case of returning (check-in) the output content, the imposed restrictions are alleviated or removed.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

What is claimed is:

1. A recording device configured to record an input content data of a digital stream in a storage unit and convert a bit-rate of the input content data having an input bit-rate and output a content data having a converted bit-rate, the recording device comprising:
    a decoder configured to decode the input content data so as to produce a first decoded content data, the decoder converting picture data in the input content data into a raster scan display format;
    an encoder configured to encode the first decoded content data so as to produce a first encoded content data having a first bit-rate lower than the input bit-rate;
    an output unit configured to output the first encoded content data having the first bit-rate to an external recording medium; and wherein
    in a case where the first encoded content data is outputted to the external recording medium by the output unit,
    the decoder decodes the input content data so as to produce the first decoded content data,
    the encoder encodes the first decoded content data so as to produce a second encoded content data having a second bit-rate lower than the input bit-rate, the second bit-rate being higher than the first bit-rate,
    the decoder decodes the second encoded content data having the second bit-rate so as to produce a second decoded content data, and
    the output unit outputs the second decoded content data to a display unit.

2. The recording device according to claim 1, wherein the sum of the first bit-rate and the second bit-rate is smaller than the input bit-rate.

3. The recording device according to claim 1, further comprising:
    an encryption unit configured to encrypt the input content data;
    a storage unit configured to store the encrypted content data; and
    a decryption unit configured to decrypt the encrypted content data in the storage unit and output the decrypted content data to the decoder.

4. The recording device according to claim 1, wherein the content data is a video content data, and the recording device further comprising:
    a resolution conversion unit configured to convert the resolution of the second decoded content data decoded by the decoder.

5. The recording device according to claim 2, wherein the second bit-rate is set to a predetermined value m (Mbps) (where m is a positive number) in a case that the first bit-rate is smaller than a predetermined bit-rate k (Mbps) (where k is a positive number).

6. The recording device according to claim 5, wherein the predetermined bit-rate k, the predetermined value m, and a bit-rate x (Mbps) of the inputted picture data (where x is a positive number) satisfy the conditions $0.1 < k/x < 0.3$, and $0.5 < m/x < 0.8$.

7. The recording device according to claim 1, wherein, in a case where the first encoded content data outputted to the external recording medium is returned to the recording device,
    the decoder decodes the input content data having the input bit-rate so as to produce a third decoded content data; and
    the output unit outputs the third decoded content data to the display unit.

8. A recording method for recording an input content data of a digital stream in a storage unit and converting a bit-rate of input content data having an input bit-rate and outputting a content data having a converted bit-rate, the method comprising:
    decoding the input content data so as to produce a first decoded content data, decoding comprising converting picture data in the input content data into a raster scan display format;
    encoding the first decoded content data so as to produce a first encoded content data having a first bit-rate lower than the input bit-rate;
    outputting the first encoded content data having the first bit-rate to an external recording medium; and wherein
    in a case where the first encoded content data is output to the external recording medium,
    decoding the input content data so as to produce the first decoded content data, encoding the first decoded content data so as to produce a second encoded content data having a second bit-rate lower than the input bit-rate, the second bit-rate being higher than the first bit-rate;
    decoding the second encoded content data having the second bit-rate so as to produce a second decoded content data; and
    outputting the second decoded content data to a display unit.

9. The recording method according to claim 8, wherein the sum of the first bit-rate and the second bit-rate is smaller than the input bit-rate.

10. The recording method according to claim 8, further comprising:
    encrypting the input content data;
    storing the encrypted content data; and
    decrypting the encrypted content data in the storage unit and output the decrypted content data to the decoder.

11. The recording method according to claim 8, wherein the content data is a video content data, and further comprising:
    converting the resolution of the second decoded content data decoded by the decoder.

12. The recording method according to claim 9, wherein the second bit-rate is set to a predetermined value m (Mbps) (where m is a positive number) in a case that the first bit-rate is smaller than a predetermined bit-rate k (Mbps) (where k is a positive number).

13. The recording method according to claim 12, wherein the predetermined bit-rate k, the predetermined value m, and a bit-rate x (Mbps) of the inputted picture data (where x is a positive number) satisfy the conditions $0.1<k/x<0.3$, and $0.5<m/x<0.8$.

14. The recording method according to claim 8, wherein, in a case where the first encoded content data outputted to the external recording medium is returned to the recording device, further comprises
    decoding the input content data having the input bit-rate so as to produce a third decoded content data; and
    outputting the third decoded content data to the display unit.

15. The recording device according to claim 1, further comprising:
    a storage unit configured to store the input content data, and wherein
    the input content data is kept stored in the storage unit before and after the first encoded content data is outputted to the external recording medium by the output unit.

16. The recording method according to claim 8, further comprising:
    storing the input content data in a storage, and wherein
    the input content data is kept stored in the storage before and after the first encoded content data is outputted to the external recording medium.

* * * * *